United States Patent
Lopez

(10) Patent No.: US 7,177,291 B1
(45) Date of Patent: Feb. 13, 2007

(54) METHOD FOR ASSOCIATING AN APPARATUS IN A COMMUNICATION NETWORK

(75) Inventor: Patrick Lopez, Livré s/Changeon (FR)

(73) Assignee: Thomson Licensing, Boulogne-Billancourt (FR)

( * ) Notice: Subject to any disclaimer, the term of this patent is extended or adjusted under 35 U.S.C. 154(b) by 1126 days.

(21) Appl. No.: 10/089,539

(22) PCT Filed: Sep. 28, 2000

(86) PCT No.: PCT/FR00/02694

§ 371 (c)(1),
(2), (4) Date: Mar. 28, 2002

(87) PCT Pub. No.: WO01/24452

PCT Pub. Date: Apr. 5, 2001

(30) Foreign Application Priority Data

Sep. 28, 1999 (FR) .................................. 99 12051

(51) Int. Cl.
*H04B 7/212* (2006.01)
*H04B 7/216* (2006.01)
*H04Q 7/00* (2006.01)
*H04Q 7/20* (2006.01)
*H04L 12/40* (2006.01)
*H04L 12/413* (2006.01)
*H04L 12/43* (2006.01)

(52) U.S. Cl. ...................... 370/322; 370/332; 370/335; 370/342; 370/348; 370/439; 370/443; 370/447; 370/461; 370/462; 370/468; 455/434; 455/450

(58) Field of Classification Search ...................... None
See application file for complete search history.

(56) References Cited

U.S. PATENT DOCUMENTS

| 5,150,362 A * | 9/1992 | Akerberg .................... 370/331 |
| 5,179,722 A * | 1/1993 | Gunmar et al. ............. 455/446 |
| 5,619,530 A | 4/1997 | Cadd et al. .................. 375/219 |
| 6,349,207 B1 * | 2/2002 | Monot et al. ................ 455/423 |
| 6,418,320 B2 * | 7/2002 | Yoshida et al. ............. 455/522 |
| 6,574,456 B2 * | 6/2003 | Hamabe .................... 455/63.3 |
| 6,741,837 B1 * | 5/2004 | Nakano et al. ............. 375/227 |

FOREIGN PATENT DOCUMENTS

| EP | 859 490 A2 * | 8/1998 |
| EP | 859 490 A3 | 8/1998 |
| EP | 932 318 A2 | 7/1999 |
| EP | 932 318 A3 | 7/1999 |

* cited by examiner

*Primary Examiner*—Chi Pham
*Assistant Examiner*—Melanie Jagannathan
(74) *Attorney, Agent, or Firm*—Joseph J. Laks; Ronald H. Kurdyla; Joel M. Fogelson

(57) ABSTRACT

The subject of the invention is a process for associating an apparatus to a first communication network, the transmissions in the first network being performed on a first channel. The process comprises:
  detection by said apparatus of the first transmission channel;
  determination of collision on said channel between signals originating from the first network and from a second network;
  in case of collision, transmission of a change of channel request to the first network.

The invention applies in particular within the framework of local networks such as HIPERLAN 2.

8 Claims, 2 Drawing Sheets

METHOD FOR ASSOCIATING AN APPARATUS IN A COMMUNICATION NETWORK

This application claims the benefit under 35 U.S.C. § 365 of International Application PCT/FR00/02694, filed Sep. 28, 2000, which claims the benefit of French Application No. 9912051, filed Sep. 28, 1999.

The invention relates to a process for associating an apparatus to a communication network, in particular a local network, capable of sharing the same transmission frequency resource as another neighboring network. The invention applies in particular within the framework of broadband radio access networks (BRAN), when an apparatus is to be associated with an existing network.

BACKGROUND OF THE INVENTION

Local networks using sharing of the radio resource in FDMA mode are required to use one channel from among a finite set of channels, which is given and granted by the standardizing bodies.

In order to avoid mutual disturbance, it is often advisable to implement techniques for probing the various channels. It is entirely possible to limit oneself to listening to a subset of channels or to explore all the channels. At the end of this listening phase, the equipment wishing to create a network will choose a channel which it deems to be free of any radio activity. We will then speak of a dynamic frequency selection (DFS) mechanism.

In an environment made up of multiple local networks, it is possible that two networks, though geographically close, may have chosen the same frequency, without however interfering with one another. This is all the more probable the lower the number of channels dedicated to this service.

However, it may happen that an apparatus which has to associate itself with a network may also be able to communicate with a base station of another network. The problem then arises of the collision of the frames originating from the two networks at the level of this apparatus.

The aim of the invention is to remedy this problem.

SUMMARY OF THE INVENTION

The subject of the invention is a process for associating an apparatus to a first communication network, the transmissions in the first network being performed on a first channel, characterized in that said process comprises the steps of:

(a) detection by said apparatus of the first transmission channel;

(b) determination of collision on said channel between signals originating from the first network and from a second network;

(c) in case of collision, transmission of a change of channel request to the first network.

According to a particular embodiment, the process furthermore comprises the step of associating the apparatus with a base station of the first network, following non-detection of collision.

According to a particular embodiment, the process furthermore comprises a repeating of the steps of the claim (a) to (c) until the first network locks onto a channel for which no collision is detected.

According to a particular embodiment, the change of channel request comprises at least one of the following parameters: an identifier of the first network, an identifier of the apparatus, the number of times that the request has been sent, a suggestion of transmission channel for the first network.

BRIEF DESCRIPTION OF THE DRAWING

Other characteristics and advantages of the invention will become apparent through the description of a particular exemplary embodiment, described with the aid of the appended drawings and among which.

DETAILED DESCRIPTION OF THE INVENTION

The present example lies within the framework of local networks of the HIPERLAN 2 TYPE (<<High Performance Radio Local Network Type 2>>). This type of network is currently undergoing specification at the European Telecommunication Standards Institute (ETSI). Fuller details regarding this network can be found in particular in the following documents, published by the ETSI:

(a) ETR0230002 V 0.1.2 (April 1999) Broadband Radio Access Networks (BRAN); High Performance Radio Local Area Networks (HIPERLAN) Type 2; System overview (b) DTS/BRAN030003-1 V 0.h (August 1999) Broadband Radio Access Networks (BRAN); HIPERLAN Type 2 Functional Specification Data Link Control (DLC) layer Part 1—Basic Data Transport Function (c) DTS/BRAN-00240004-2 V 0.a (August 1999) Broadband Radio Access Networks (BRAN) Packet based Convergence Layer for HIPERLAN and HIPERACCESS; Part 2: Ethernet Service Specific Convergence Sublayer (d) DTS/BRAN-0020004-2 V 0.a (July 1999) Broadband Radio Access Networks (BRAN); HIPERLAN Type 2 Functional Specification; Radio Link Control (RLC) sublayer (e) DTS/BRAN030003-1 V 0.j (September 1999) Broadband Radio Access Networks (BRAN); HIPERLAN Type 2 Functional Specification Part 1—Physical (PHY) layer Other ETSI documents relating to HIPERLAN 2 are referenced in document (a).

Figure 1:
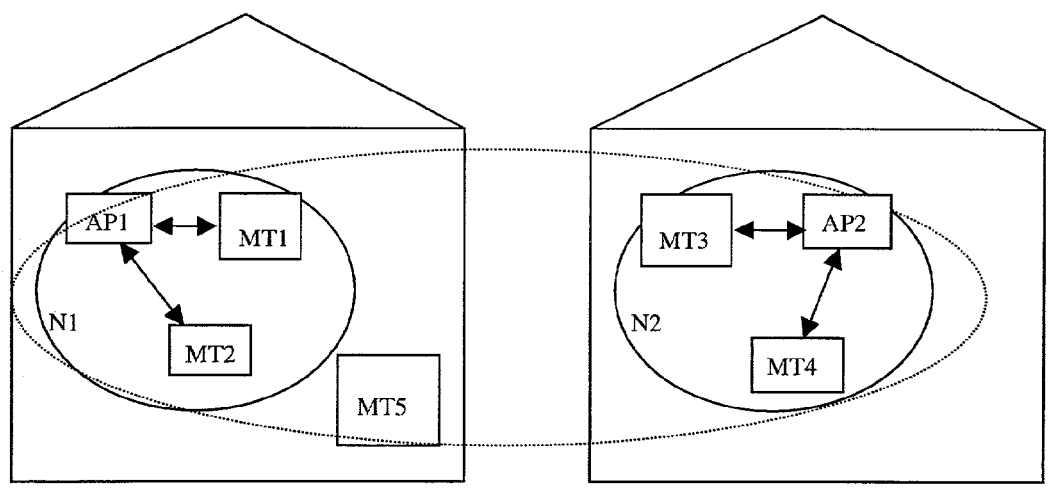
FIG. 1 diagrammatically represents two local networks implementing the process according to the present exemplary embodiment.
Figure 2:
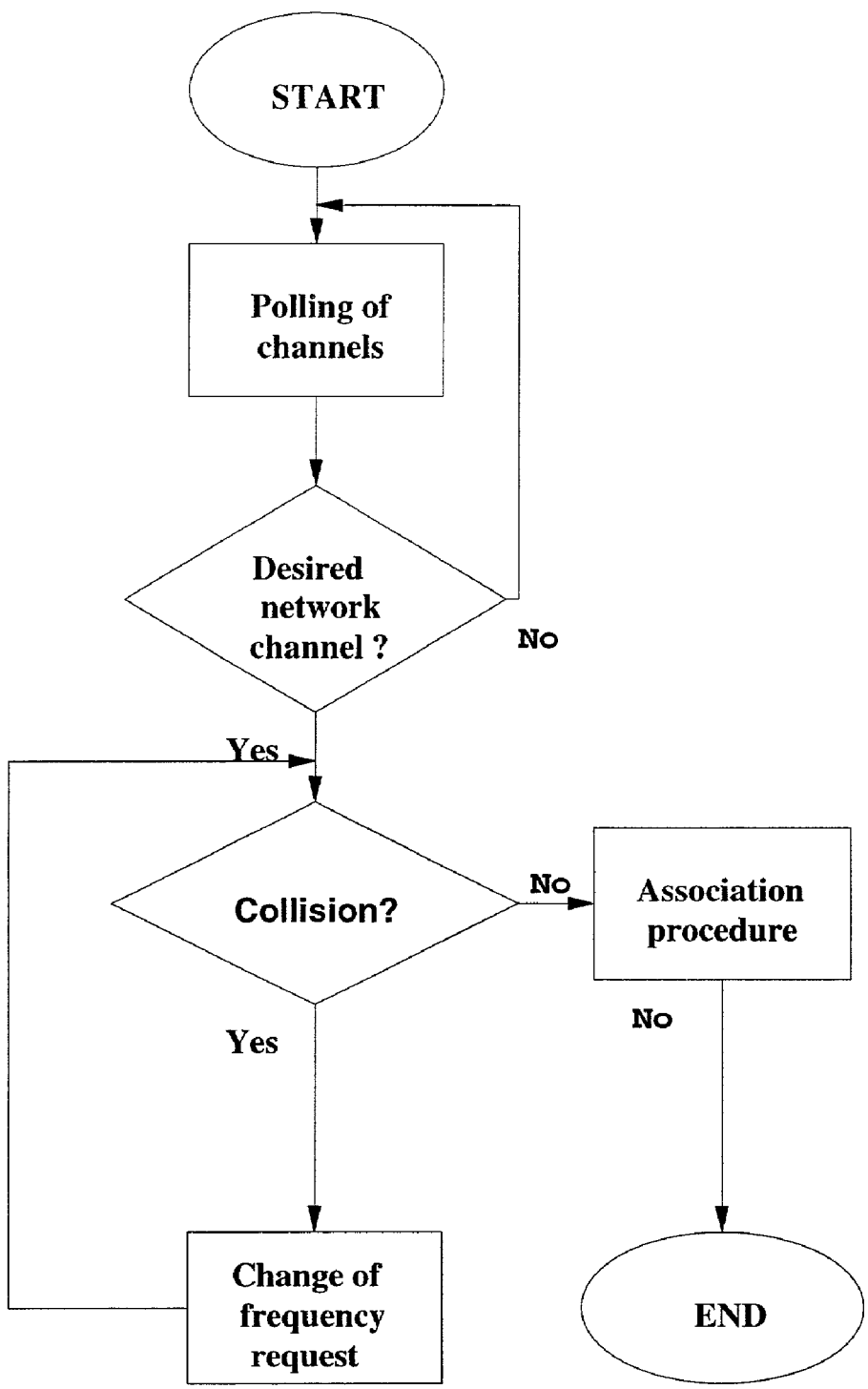
FIG. 2 is a flowchart of the process according to the present exemplary embodiment.

FIG. 1 is a diagram of two dwellings each possessing a local network, N1 and N2 respectively. Of course, the invention is not limited to this particular case, and two networks may perfectly well be situated in one and the same building. Each network comprises a central device or base station AP1, AP2. These base stations are the respective central facilities of each of the networks N1 and N2. In function terms, they comprise the functionality of <<central controllers>> of the HIPERLAN 2 environment.

Each network furthermore comprises mobile terminals MTx, communicating with the access point associated with the network. In this regard, the network N1 comprises the terminals MT1 and MT2, while the network N2 comprises the terminals MT3 and MT4.

When a new mobile terminal MT5 is to be integrated into an existing network, this terminal traverses the frequency channels on which the networks may transmit until a signal of sufficient power and intelligibility is detected. The intelligibility is related to the error rate detected by the terminal in the data received.

In what follows it will be assumed that initially the two terminal N1 and N2 use the same transmission channel.

Moreover, for the sake of the example, it is assumed that the terminal MT5 can communicate both with the base station of the network N1 and with the base station of the network N2.

In the case where the traffic on each of the two networks N1 or N2 does not occupy the whole of the time frame, the new terminal has the possibility of intelligibly receiving the information from at least one of the networks. According to the present example, this is the network N1. Generally, the first few items of information thus collected relate to the identity of the network N1 and to the access entitlements. This information allows the terminal to determine whether it has the access entitlements with regard to this network N1.

According to the present example, the terminal MT5 has prior knowledge of the identifier of the network with which it is assumed to associate itself. It thus recognizes the frame corresponding to this network. This identifier may be the <<Network_Operator_ID>> identifier.

In the case where the terminal is entitled to access this network N1, it initiates a procedure called association, and via which the terminal registers itself in the network N1 and obtains an identity in return. The protocols generally implemented in respect of this operation require dialogs between on the one hand the terminal and on the other hand the network already formed. For example, it is often necessary to carry out the authentication of the terminal before granting it an identity in the network.

In the present case, the communications between the terminal and the network N1 are subjected to the disturbances emanating from the network N2. Thus, there is nothing to guarantee that the association procedure will be performed correctly, since it is strongly dependent on the activity on the concurrent network N2. The response of the network N1 to the association request of the terminal can collide at the level of the terminal with a portion of traffic of the network N2. This is detected by the terminal MT5 by the fact that certain frames or parts of frames are not decodable. The terminal MT5 will declare that it is in a situation of interference when it is not able correctly to receive these association messages originating from the network N1. Thus, the interfering signal, for example a frame of another network, need not be intelligible in respect of the apparatus seeking to detect the interference. The terminal simply has to know the address of the access point of the network with which it wishes to associate itself.

Thus, instead of initiating a conventional association procedure, the terminal sends the network N1 a so-called emergency request, consisting in asking the network N1 to initiate a dynamic frequency selection, to the exclusion of the current frequency. This request also contains the identity of the network N1, so as to prevent the two networks N1 and N2 from changing frequency simultaneously: the networks detect the identity and react only if it is addressed to them.

The emergency request is transmitted in the RCH field of the HIPERLAN 2 frame of the network N1.

According to the present example, the emergency request comprises the following parameters:

TABLE 1

| Parameter | Description |
| --- | --- |
| AP_ID or CC_ID | Identifies the base station (AP: access point, CC: Central controller) Content of the BCCH field of the frame received from the network N1 |
| NET_ID | Content of the BCCH field of the frame received from the network N1 |

TABLE 1-continued

| Parameter | Description |
| --- | --- |
| 'Number_of_Request' | Indicates the number of times that the message has been sent |
| 'Frequency_index' | Index of the frequency/of the suggested channel |

The third parameter can influence the decision of the base station AP1 to accept or reject the request of the terminal, in the event of poor operation of the mobile terminal. This field is optional.

The BCCH field is a field of the frame defined by the documents relating to HIPERLAN 2.

According to a variant embodiment, the emergency request furthermore comprises a channel suggestion on the part of the terminal. This suggestion can be determined as follows: the terminal monitors the activity on various channels, for example for a predetermined time, and thus determines which channels are liable to be unoccupied.

This technique guarantees that the terminal is correctly understood by the network N1, since the terminal has transmitted its request in the scheduled area of the frame of the network N1. The network A has recognized its identity in this request and initiates a DFS. At the end of the DFS, the network N1 will have changed frequency and so the terminal will initiate a normal association procedure with regard to this new frequency, on condition of course that there has been no collision with a third network.

The emergency request of the terminal will be received by members of the network N2 either intelligibly, or in collision with a portion of the traffic of this network.

In the case of a collision, the latter is resolved by the repetition mechanism or by the error correcting coding used by the network N2. This request being short, it only very locally disturbs the activity of the network N2.

In the case of intelligible decoding of the request, the members of the network N2 understand that the DFS request relates to the network N1, and thus no DFS is implemented.

The invention claimed is:

1. A process for associating an apparatus to a first communication network, with transmissions in the first network being performed on a first channel, wherein the process comprises, the steps of:
  (A) detection by said apparatus of the first transmission channel;
  (B) determination of a collision on said channel between signals originating from the first network and from a second network;
  (C) when said collision has been determined, transmitting a change of channel request to the first network, and
  (D) associating the apparatus with a base station of the first network, following non-detection of collision.

2. A process for associating an apparatus to a first communication network, with transmissions in the first network being performed on a first channel, wherein the process comprises, the steps of:
  (A) detection by said apparatus of the first transmission channel;
  (B) determination of a collision on said channel between signals originating from the first network and from a second network;
  (C) when said collision has been determined, transmitting a change of channel request to the first network, wherein the preceding steps are repeated until the first network locks onto a channel for which no collision has been detected.

3. A process for associating an apparatus to a first communication network, with transmissions in the first network being performed on a first channel, wherein the process comprises, the steps of:
(A) detection by said apparatus of the first transmission channel;
(B) determination of a collision on said channel between signals originating from the first network and from a second network;
(C) when said collision has been determined, transmitting a change of channel request to the first network, wherein the change of channel request comprises an identifier of the first network.

4. A process for associating an apparatus to a first communication network, with transmissions in the first network being performed on a first channel, wherein the process comprises, the steps of:
(A) detection by said apparatus of the first transmission channel;
(B) determination of a collision on said channel between signals originating from the first network and from a second network;
(C) when said collision has been determined, transmitting a change of channel request to the first network, wherein the change of channel request comprises an identifier of the apparatus.

5. A process for associating an apparatus to a first communication network, with transmissions in the first network being performed on a first channel, wherein the process comprises, the steps of:
(A) detection by said apparatus of the first transmission channel;
(B) determination of a collision on said channel between signals originating from the first network and from a second network;
(C) when said collision has been determined, transmitting a change of channel request to the first network, wherein the request comprises a parameter indicating a transmission channel suggested to the first network.

6. A process for associating an apparatus to a first communication network, with transmissions in the first network being performed on a first channel, wherein the process comprises, the steps of:
(A) detection by said apparatus of the first transmission channel;
(B) determination of a collision on said channel between signals originating from the first network and from a second network;
(C) when said collision has determined, transmitting a change of channel request to the first network, wherein the request comprises a parameter indicating the number of times that the request has already been sent to the first network.

7. A process for associating an apparatus to a first communication network, with transmissions in the first network being performed on a first channel, wherein the process comprises, the steps of:
(A) detection by said apparatus of the first transmission channel;
(B) determination of a collision on said channel between signals originating from the first network and from a second network;
(C) when said collision has been determined, transmitting a change of channel request to the first network, wherein before association is made from the apparatus to the first network, the apparatus knows the identity of a central controller of the first network and in that the frames transmitted on this first network comprise a field identifying the central controller.

8. The process as claimed in claim 7, wherein the determination of the collision is carried out by detecting the fact that the apparatus cannot decode at least one of:
certain frames transmitted on the first network and parts of frames transmitted on the first network.

* * * * *